United States Patent [19]

Seki et al.

[11] Patent Number: 5,075,876

[45] Date of Patent: Dec. 24, 1991

[54] FIGURE HIDDEN-LINE PROCESSING METHOD

[75] Inventors: Masaki Seki; Masatoshi Yoshizaki, both of Tokyo; Takeshi Hosono; Shizuaki Hayanagi, both of Yamanashi, all of Japan

[73] Assignee: Fanuc Ltd., Minamitsuru, Japan

[21] Appl. No.: 362,441

[22] PCT Filed: Sep. 22, 1988

[86] PCT No.: PCT/JP88/00966

§ 371 Date: May 24, 1989

§ 102(e) Date: May 24, 1989

[87] PCT Pub. No.: WO89/03095

PCT Pub. Date: Apr. 6, 1989

[30] Foreign Application Priority Data

Sep. 29, 1987 [JP] Japan .................. 62-244587

[51] Int. Cl.⁵ .............................. G06K 1/00
[52] U.S. Cl. .................... 395/121; 340/729
[58] Field of Search ............ 364/518, 521–522, 364/927.2, 237.2; 340/729, 723, 724; 382/49, 14

[56] References Cited

U.S. PATENT DOCUMENTS 4,847,789 7/1989 Kelly et al. ............ 364/522

*Primary Examiner*—Arthur G. Evans
*Attorney, Agent, or Firm*—Staas & Halsey

[57] ABSTRACT

When a main figure (FG1) and at least one subordinate figure (FG2) are designated, a processor (11a) obtains, a point of intersection at which a figure element of the main figure (FG1) intersects each figure element, e.g., a linear element ($EL_1$), constituting the subordinate figure ($FG_2$). If a point of intersection exists, the figure element ($EL_1$) is divided at the point of intersection ($P_c$) to generate subordinate figure elements ($EL_{11}$, $EL_{12}$), and an item of hidden-flag data, which is indicative of a subordinate figure element ($EL_{12}$) on an inner side of the main figure, is turned on. The image of the subordinate figure element ($EL_2$) is not displayed on the display screen. In a case where a figure element such as the figure element ($EL_2$) of the subordinate figure ($FG_2$) is not intersected by any of the figure elements of the main figure (FG1), it is checked to see whether a starting point ($P_s$) of the figure element resides on the inner side or outer side of the main figure. If it is on the inner side, the item of hidden-flag data of this element is turned on and this element is not displayed on the display screen.

6 Claims, 8 Drawing Sheets

FIG. 6 (a)
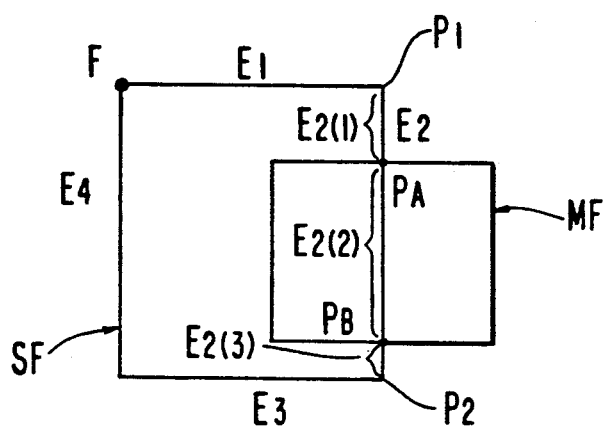
FIG. 6 (b)
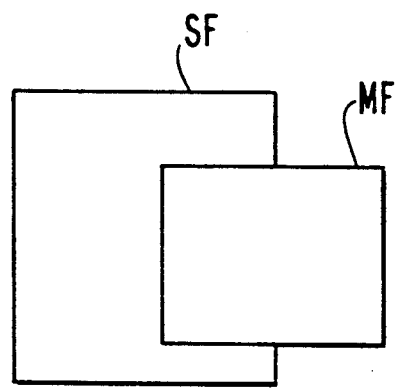
FIG. 7 (a)
| FIGURE DATA | HIDE FLAG |
|---|---|
| DF | 0 |
| DE1 | 0 |
| DE2 | 0 |
| DE3 | 0 |
| DE4 | 0 |
FIG. 7 (b)
| FIGURE DATA | HIDE FLAG |
|---|---|
| DF | 0 |
| DE1 | 0 |
| DE2(1) | 0 |
| DE2(2) | 1 |
| DE2(3) | 0 |
| DE3 | 0 |
| DE4 | 0 |

FIGURE HIDDEN-LINE PROCESSING METHOD

DESCRIPTION

1. Technical Field

This invention relates to a method of processing hidden lines of a figure. More particularly, the invention relates to a figure hidden-line processing method in a case where a plurality of figures are displayed in superimposed form as in a perspective diagram.

2. Background Art

In a design and drafting system (CAD/CAM system) using a computer, a perspective plan view or perspective sectional view of a designed structure is displayed on a display screen or drafted on paper to check the design of the structure FIG. 10 is a perspective sectional view of a mold, in which plates Pij, parts provided on the plates (mounting bolts BLi, eject pins EPi, guide pins GPi, lifter pins, etc ) and the perspective figures of the part holes are displayed in superimposed form In a perspective view, as will be apparent from FIG. 10, figures (parts, plates, part holes, etc.) are displayed or drawn in mutually superimposed form. Consequently, since the plates and bolts as well as the bolts and pins, for example, are displayed or drafted overlapping each other, the drawing is difficult to read.

Accordingly, in order to make the drawing easier to read, the conventional practice is to perform figure hidden-line processing to conceal unnecessary lines.

However, since the conventional hidden-line processing remakes the figure elements such as the straight lines and circular arcs that constitute a figure and these figure elements cannot be restored once they are remade, the hidden-line processing requires considerable time and the original figure cannot be displayed (restored) after hidden-line processing.

Furthermore, with the conventional hidden-line processing, a figure and portion overlapping the figure are ascertained by the operator himself, who is required to designate these portions on a figure element-by-element basis. This is a laborious operation.

SUMMARY OF THE INVENTION

Accordingly, an object of the present invention is to provide a hidden-line processing method through which processing time can be curtailed and restoration is possible, and wherein hidden-line processing can be performed upon automatically ascertaining all superimposed figures merely by designating the superimposed figures in figure units.

In the figure hidden-line processing of the present invention, one main figure on an upper side and at least one subordinate figure on a lower side are designated from among a plurality of figures displayed in superimposed form on a display screen. When this is done, a point of intersection at which a figure element of the main figure intersects each figure element constituting the subordinate figure is obtained. In case of intersection, the figure element of the subordinate figure is divided at the point of intersection to generate subordinate figure elements, and a subordinate figure element on an inner side of the main figure is provided with information indicating that this subordinate figure element is not to be displayed. When a starting point of the figure element of the subordinate figure resides on an inner side of the main figure in case of non-intersection, this figure element data is provided with information indicating that this figure element is not to be displayed.

Hidden-line processing is performed by not displaying, on the display screen, figure elements having the information indicating non-display.

In the present invention, when display of the entirety of a subordinate figure is requested in a state where the subordinate figure is being displayed with some of its lines concealed owing to hidden-line processing, the entirety of the subordinate figure requested is displayed.

BRIEF DESCRIPTION OF THE DRAWINGS

FIGS. 6(a), 6(b), 7(a) and 7(b) are views for describing hidden-line processing;

DESCRIPTION OF THE PREFERRED EMBODIMENT

Figure 1:
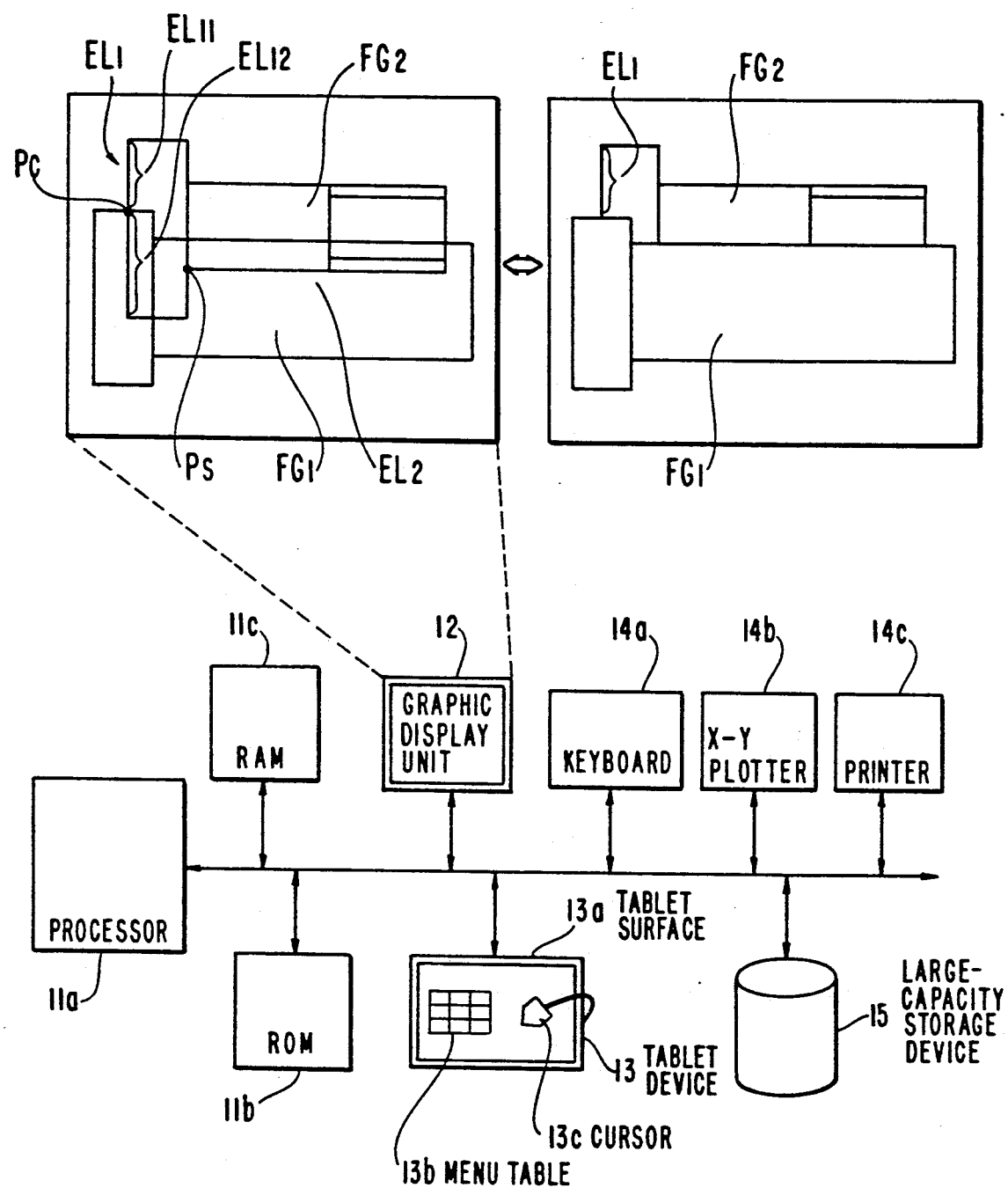
FIG. 1 is a block diagram of CAD/CAM system for practicing the present invention.

FIG. 1 is a block diagram of a CAD/CAM system for practicing the present invention.

Shown in FIG. 1 are a processor 11a, a program memory (ROM) 11b, a RAM 11c, a graphic display unit 12, a tablet device 13, a keyboard 14a, an XY plotter 14b, a printer 14c for outputting a list or the like, and a large-capacity storage device such as a floppy or hard disk. Two figures FG1, FG2 are displayed in superimposed form on a display screen.

Figure 2:
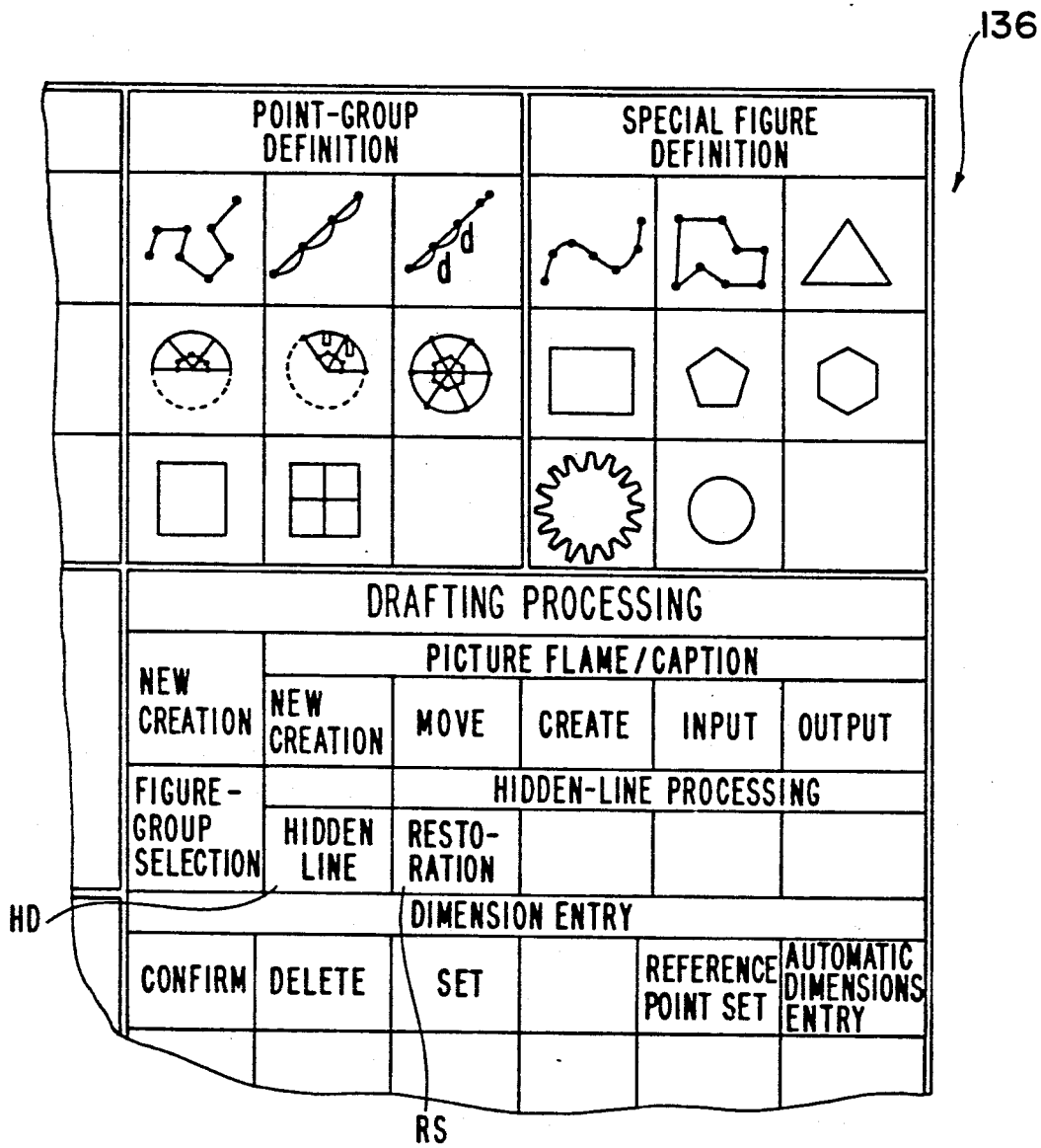
FIG. 2 is a view for describing the principal portions of a menu table.

The tablet device 13 has a tablet surface 13a, a menu table 13b affixed to the tablet surface, and a tablet cursor which, by being moved on the tablet surface, makes it possible to move a graphic cursor (not shown) on the display screen. As shown in partial detail in FIG. 2, the menu table 13b is provided with a "HIDDEN LINE" item HD for commanding hidden-line processing, and a "RESTORATION" item RS for commanding restoration processing.

Hidden-line processing is requested by picking the "HIDDEN LINE" item HD on menu table 13b in a state where the perspective view of a structure is being displayed, as shown at the upper, left-hand side of FIG. 1, at the conclusion of designing.

In response to the request for hidden-line processing, the processor 11a causes the display screen to present an inquiry regarding the figures necessary for proceeding with hidden-line processing, namely an inquiry regarding one main figure on the upper side and at least one subordinate figure on the lower side.

Figure 3A:
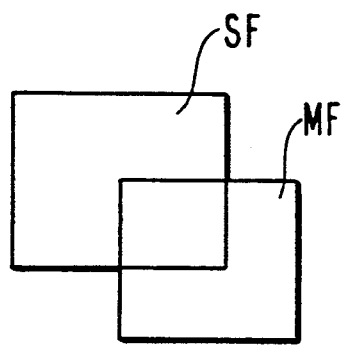
FIGS. 3(a), 3(b), 4(a) and 4(b) are views for describing the general features of hidden-line processing.
Figure 3B:
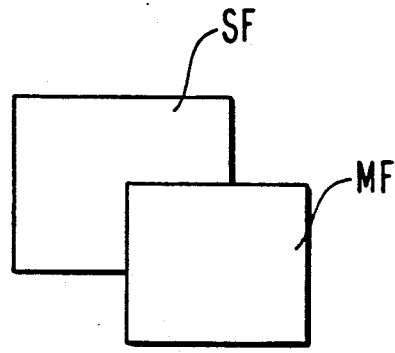
Figure 4A:
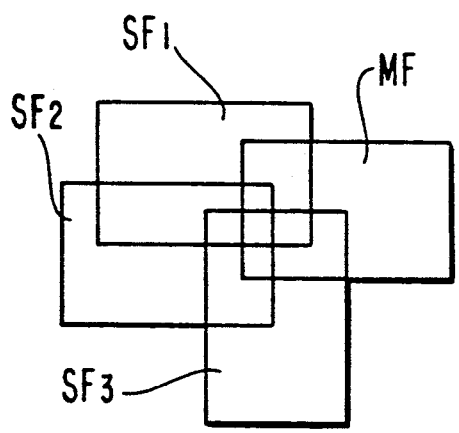
Figure 4B:
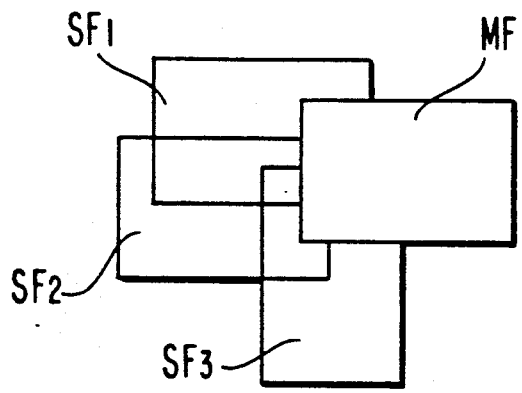

In a case where two figures MF, SF overlap, as shown in FIG. 3(a), in which it is assumed that MF represents a main figure and SF a subordinate figure, the figures are displayed with the portion of the subordinate figure underlying the main figure MF being hidden from view, as shown in FIG. 3(b). In a case where four figures MF, SF1-SF3 are superimposed, as shown in FIG. 4(a), in which MF represents the main figure and SF1-SF3 the subordinate figures, the figures are displayed with the portions of the subordinate figures underlying the main figure MF being concealed from view, as shown in FIG. 4(b).

In response to the inquiry for the main and subordinate figures, the operator designates one main figure FG1 (see FIG. 1) and at least one subordinate figure FG2 by means of the graphic cursor.

When the one main figure FG1 on the upper side and at least one subordinate figure FG2 on the lower side are designated, the processor 11a executes hidden-line processing under program control. Though the details of hidden-line processing will be described later in accordance with FIG. 5, the general features thereof will now be discussed.

The processor 11a obtains a point of intersection between the line defining the external shape of the main figure FG1 and each figure element (e.g., see the linear figure element $EL_1$) constituting the subordinate figure FG2. When a point of intersection exists, the figure element $EL_1$ is divided by the point of intersection $P_c$ to produce subordinate figure elements $EL_{11}$, $EL_{12}$, and an item of hidden-flag data indicative of the subordinate figure $EL_{12}$ on the inner side of the main figure is turned on. Thereafter, the above-described hidden-line processing is applied to all figure elements of the subordinate figure FG2. When an image is subsequently produced, the image of the subordinate figure element $EL_{12}$ whose hidden-flag data is ON is not generated and, hence, this subordinate figure element is not displayed on the display screen.

In a case where a figure element such as the figure element $EL_2$ of the subordinate figure FG2 is not intersected by the line defining the external shape of the main figure FG1, it is checked to see whether a starting point $P_s$ of the figure element resides on the inner side or outer side of the main figure. If it is on the inner side, the item of hidden-flag data of this element is turned on and this element is not displayed on the display screen, just as set forth above. A figure element on the outer side is displayed.

Figure 5:
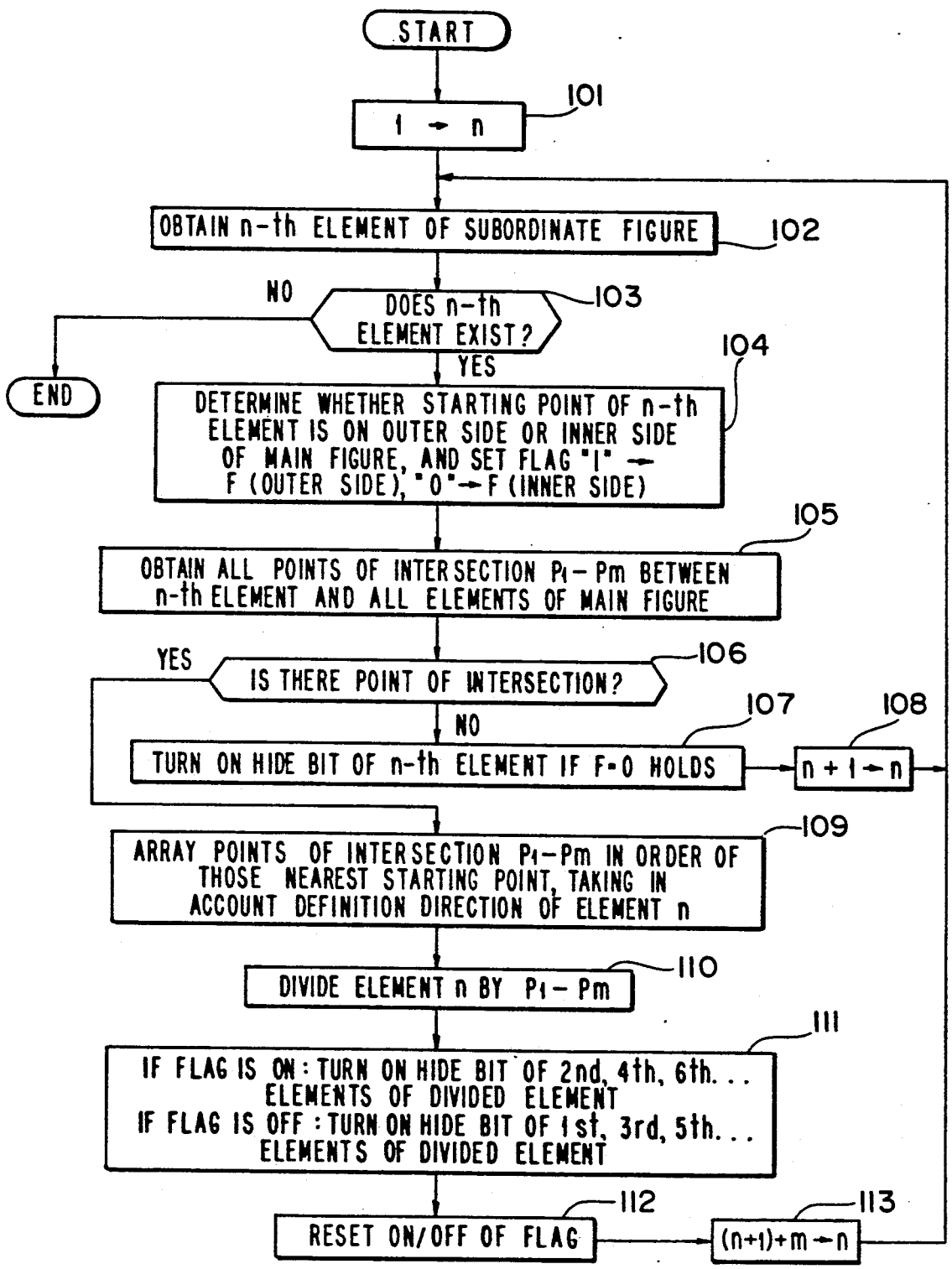
FIG. 5 is a flowchart of hidden-line processing.

FIG. 5 is a detailed flowchart of hidden-line processing, and FIGS. 6 and 7 are views for describing hidden-line processing.

When one main figure MF (see FIG. 6) and one subordinate figure SF are designated, the processor performs the operation 1→n (step 101) and then obtains an n-th figure element of the subordinate figure (step 102). It should be noted that the subordinate figure SF is defined by arraying data (DF, $DE_1$, $DE_2$, . . . $DE_4$) specifying starting point coordinates and each of the figure elements $E_1$, $E_2$, . . . $E_4$ clockwise from a starting point F, as shown in FIG. 7(a).

Hidden-line processing is terminated if the n-th figure element does not exist. If the n-th figure element does exist, it is checked to determine whether the starting point of the n-th figure element $E_n$ resides on the outer or inner side of the main figure MF. If the starting point is on the outer side, a flag F indicating the particular side is set to "1"; if it is on the inner side, the flag F indicating the particular side is set to "0" (steps 103, 104).

Next, the point of intersection between the n-th figure element $E_n$ and the line defining the external shape of the main figure is obtained (step 105).

If a point of intersection does not exist (see figure elements $E_1$, $E_3$, $E_4$ in FIG. 6), the flag indicating the side is checked. If F = "1" (i.e., the starting point of the n-th figure element resides on the outer side of the main figure MF), the item of hidden-flag data indicative of the n-th figure element data is kept in the off (="0") state. If F = "0" (the starting point resides on the inner side of the main figure MF), the item of hidden-flag data indicative of the n-th figure element data is turned on (="1"), after which n is incremented by performing the operation n+1→n and processing from step 102 onward is continued (steps 106-108).

Of points of intersection $P_1$-$P_m$ exist between the n-th figure element $E_n$ and the main figure, these points of intersection are arrayed in accordance with the direction (clockwise) in which the subordinate figure is defined (step 109), the n-th figure element $E_n$ is divided by the points of intersection $P_1$-$P_m$, the figure data $DE_n$ indicative of the n-th figure element is deleted and, in its place, figure data $DE_n(1)$-$DE_n(m+1)$ indicative of (m+1)-number of subordinate figure elements obtained by division are inserted to define the subordinate figure (step 110). In the example of FIG. 6, the second figure element $E_2$ has two points of intersection $P_A$, $P_B$ with the main figure MF. The second figure element $E_2$ is divided into three subordinate figure elements $E_2(1) = P_1P_{A'}$, $E_2(2) = P_AP_B$, $E_2(3) = P_BP_2$ by the points of intersection $P_A$, $P_B$, and the figure data $DE_2$ of the second figure element is replaced by the figure data $DE_2(1)$-$DE_2(3)$ of these subordinate figure elements, as shown in FIG. 7.

Next, a check is made to determine whether each subordinate figure element obtained by the division is on the inner or outer side of the main figure MF, and the hidden-flag data indicative of shape data conforming to a figure element on the inner side of the main figure is turned on (made "1"). A specific method of turning on the hidden-flag data is as follows: The status "0" or "1" of the flag F indicating the particular side is checked. If F = "1" holds (if the starting point of the n-th figure element is on the outer side of the main figure), the hidden-flag data of the even-numbered subordinate figure element is turned on; if F = "0" holds (if the starting point is on the inner side of the main figure), the hidden-flag data of the odd-numbered subordinate figure element is turned on (step 111). In the example of FIG. 6, the starting point $P_1$ of the second figure element $E_2$ is on the outer side of the main figure MF, so that the hidden-flag data of the second subordinate figure element $E_2(2)$ is turned on.

At the conclusion of the processing for turning on the hidden-flag data, the processor resets the flag F indicating the particular side ("0"→F). Thereafter, assuming that the number of subordinate figure elements is (m+1), n is updated by the operation $$n+(m+1)\rightarrow n$$

(steps 112, 113), after which processing from step 102 onward is repeated.

When hidden-line processing ends with regard to all figure elements of the subordinate figure SF by virtue of the foregoing operations, the subordinate figure portion SF underlying the main figure MF will be concealed from view at display of the figures, as shown in FIG. 6(b), when an image is generated based on the figure element data for which the hidden-flag data is not ON.

Figure 8:
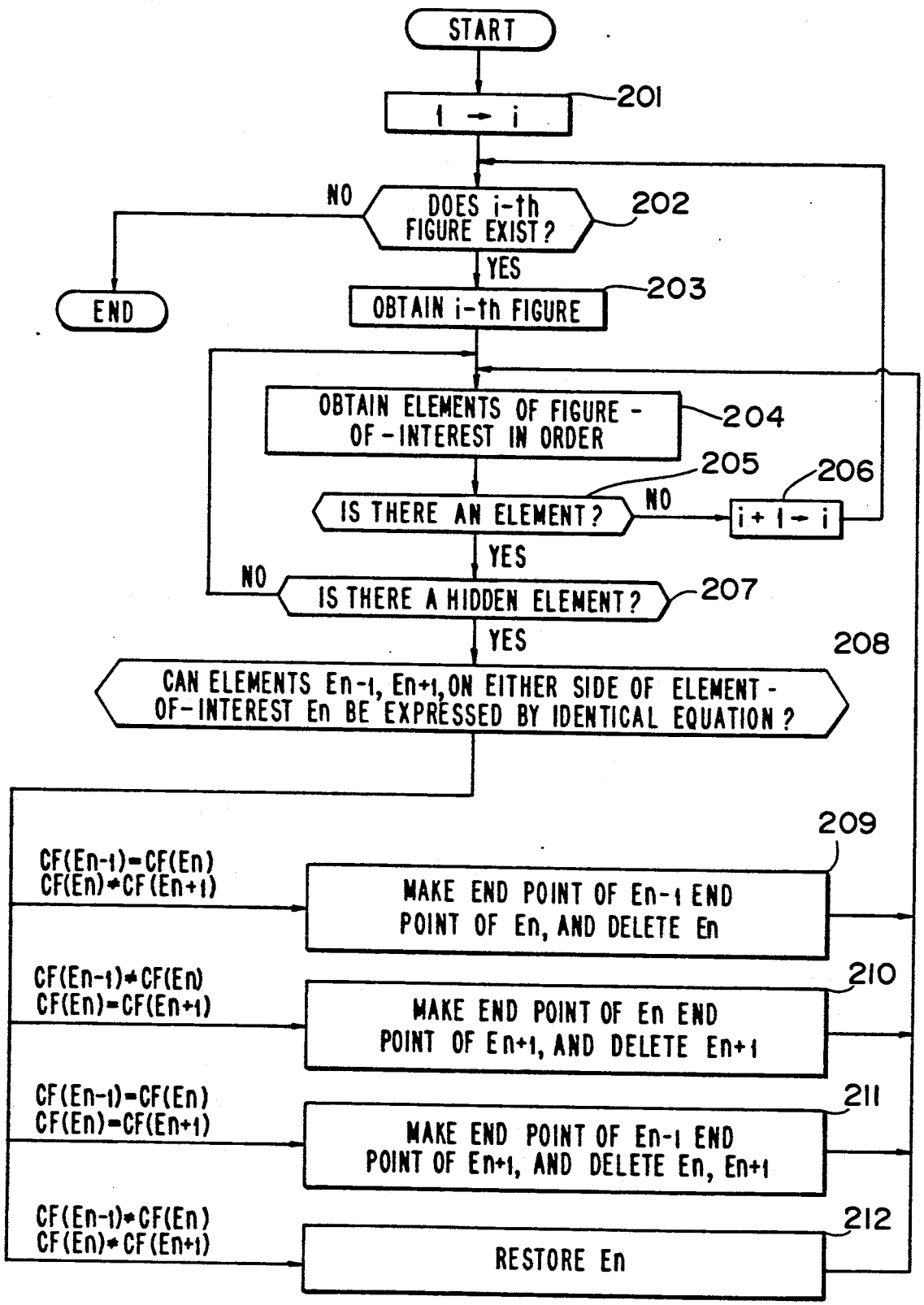
FIG. 8 is a flowchart of restoration processing.
Figure 9:
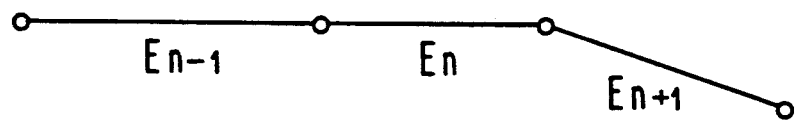
FIGS. 9(a)-9(d) are a view for describing restoration processing.
Figure 9:
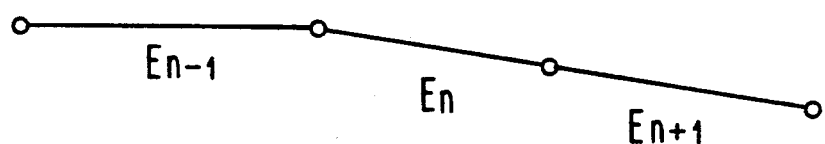
Figure 9:
Figure 9:
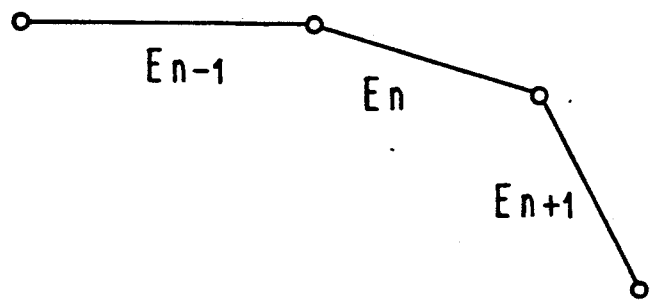
Figure 10:
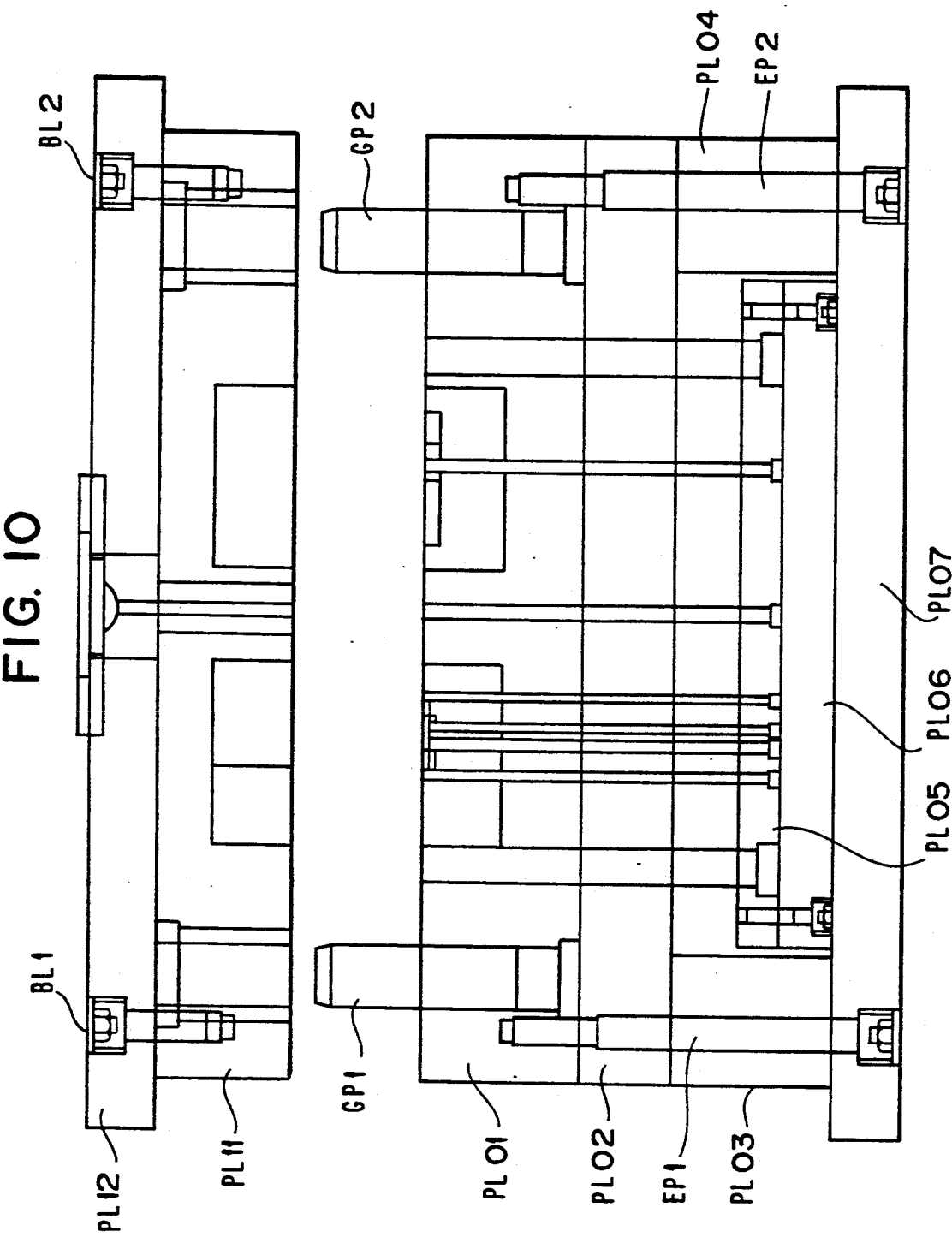
FIG. 10 shows an example of a perspective sectional view of a mold.

The foregoing relates to hidden-line processing. There are also occasions when it is required to effect a restoration from the state in which a portion of the subordinate figure is concealed from view to the original state in which this portion of the subordinate figure is not concealed. FIG. 8 is a flowchart of such restoration processing, and FIG. 9 is a view for describing the restoration processing.

When it is desired to restore a figure having hidden lines, the operator selects the "RESTORATION" item RS on the menu table 13b (FIG. 2) to request restoration processing. In response, the processor causes the display screen to make an inquiry regarding the figure desired to be restored, thereby prompting the operator to select at least one figure (actually a figure element) desired to be restored.

When at least one figure is selected, the processor 11a performs the operation 1→i and checks to see whether a figure picked i-th among the selected figures exists. If it does not exist, restoration processing is terminated (steps 201, 202). If a figure picked i-th does exist, the figure is obtained (step 203).

Next, the figure elements of this figure are found in order starting from the starting point (step 204).

A check is performed to determine if a figure element exists (step 205). If a figure element does not exist, it is construed that the restoration processing of the i-th figure has ended, i is updated by the operation 1+i→i (step 206), and processing from step 202 onward is repeated.

If a figure element does exist (assumed to be an n-th figure element $E_n$), on the other hand, then it is checked to see whether the item of hidden-flag data of this figure element data is ON (step 207); if the item of hidden-flag data is not ON, processing from step 204 onward is repeated.

If the hidden-flag data is ON, however, it is checked to determine whether an element $E_{n-1}$ preceeding the element $E_n$ and an element $E_{n+1}$ following the element $E_n$ can be expressed by the same equation (i.e., if the elements are linear elements, it is determined whether they lie on the same straight line; if the elements are circular arcs, it is determined whether they lie on the same circle) (step 208). If the element $E_{n-1}$ and the element $E_n$ can be expressed by the same equation, the notation $$CF(E_{n-1})=CF(E_n)$$

is used. If these elements cannot be expressed by the same equation, the notation $$CF(E_{n-1})\neq CF(E_n)$$

is used.

If, as shown in FIG. 9(a), the following is found to hold in the checking operation of step 208:

$$CF(E_{n-1})=CF(E_n)$$

$$CF(E_n)\neq CF(E_{n+1})$$

then the end point of the figure element $E_{n-1}$ is made the end point of the element $E_n$, the element $E_n$ is deleted (step 209) and processing from step 204 onward is repeated If, as shown in FIG. 9(b), the following is found to hold in the checking operation of step 208:

$$CF(E_{n-1})\neq CF(E_n)$$

$$CF(E_n)=CF(E_{n+1})$$

then the end point of the figure element $E_n$ is made the end point of the element $E_{n+1}$, the element $E_{n+1}$ is deleted (step 210) and processing from step 204 onward is repeated.

If, as shown in FIG. 9(c), the following is found to hold in the checking operation of step 208:

$$CF(E_{n-1})=CF(E_n)$$

$$CF(E_n)=CF(E_{n+1})$$

then the end point of the figure element $E_{n-1}$ is made the end point of the element $E_{n+1}$, the elements $E_n$, $E_{n+1}$ are deleted (step 211) and processing from step 204 onward is repeated.

If, as shown in FIG. 9(d), the following is found to hold in the checking operation of step 208:

$$CF(E_{n-1})\neq CF(E_n)$$

$$CF(E_n)\neq CF(E_{n+1})$$

then the element $E_n$ is restored (step 212) and processing from step 204 onward is repeated.

When the image is subsequently generated based on the restored figure data, the lines of the designated figure are displayed in full view.

In accordance with the present invention, one main figure constituting an upper side and at least one subordinate figure constituting a lower side are designated in figure units from among a plurality of figures, and hidden-line processing can be performed by automatically discriminating all overlapping figure elements. As a result, processing time can be shortened and the operation for performing the hidden-line processing can be facilitated.

Further, in accordance with the invention, hidden-line processing is such that an item of hidden-flag data indicative of the figure element data conforming to a hidden line is turned on. In restoration processing, the hidden-flag data is turned off and the figure data which prevailed prior to hidden-line processing are restored depending upon whether the elements on either side of an element whose hidden-flag data is ON can be expressed by the same equation. This makes it possible to simply restore and display lines hidden by hidden-line processing.

We claim:

1. A method of displaying and processing hidden lines of a main figure having an inside, an outside and including figure elements, and a subordinate figure including figure elements, the figure elements of the main figure and the figure elements of the subordinate figure being defined by figure element data including starting point coordinate data, comprising:

arranging said figure element data based on the subordinate figure and the main figure;

obtaining a point of intersection at which a figure element of the main figure intersects each figure element of the subordinate figure;

when a figure element of the subordinate figure intersects a figure element of the main figure, deleting figure element data indicative of the intersecting figure element from the figure element data representing subordinate figure; and in case of intersection, dividing the figure element of the subordinate figure at said point of intersection to generate subordinate figure elements, and providing a subordinate figure element on the in-side of the main figure with information indicating that the subordinate figure element is not to be displayed;

inserting divided subordinate figure element data based on the intersection figure element;

when a starting point of the figure element of said subordinate figure resides on the in-side of the main figure in case of non-intersection, providing said figure element data with information indicating that said figure element is not to be displayed; and conditionally displaying the main figure and the subordinate figure in accordance with said information indicating that the figure elements are not to be displayed.

2. A method of displaying and processing hidden lines of a figure according to claim 1, wherein the figure element data includes hidden-flag data and step d) includes the substep of displaying said figure in accordance with said hidden-flag data.

3. A method of displaying and processing hidden lines of a main figure having an inside, an outside and including figure elements, and a subordinate figure including figure elements, comprising:

obtaining a point of intersection at which a figure element of the main figure intersects each figure element of the subordinate figure;

in case of intersection, dividing the figure element of the subordinate figure at said point of intersection to generate subordinate figure elements, and providing a subordinate figure element on the in-side of the main figure with information indicating that the subordinate figure element is not to be displayed;

when a starting point of the figure element of said subordinate figure resides on the in-side of the main figure in case of non-intersection, providing said figure element data with information indicating that said figure element is not to be displayed; and conditionally displaying the main figure and the subordinate figure in accordance with said information indicating that the figure elements are not to be displayed when the subordinate figure is being displayed with some of its lines hidden, conditionally displaying the main figure and the subordinate figure without consideration of the hidden-flag data indicating non-display of figure elements of the subordinate figure.

4. A method of displaying and processing hidden lines of a figure according to claim 1, further comprising the steps of:

if a starting point of the intersecting figure element resides on the out-side of the main figure, said hidden-flag data indicative of even-numbered subordinate figure elements of the subordinate figure are turned on; and if the starting point of the intersecting figure element resides on in-side of the main figure, said hidden-flag data indicative of odd-numbered subordinate figure elements of the subordinate figure elements are turned on.

5. A method of displaying and processing hidden lines of a figure according to claim 3, further comprising the steps of:

conditionally restoring the deleted figure element data;

deleting the divided subordinate figure element data so as to restore the subordinate figure element data; and displaying the restored subordinate figure.

6. A method of displaying and processing hidden lines of a figure to claim 5, further comprising the steps of:

obtaining a subordinate figure element having hidden-flag data indicating non-display of the figure element;

determining if figure elements adjacent to said obtained subordinate figure element can be expressed by an equation identical with that expressing said obtained subordinate figure element; and expressing the obtained figure element and the adjacent figure elements that have an equation that is the same as said obtained figure element by a single item of figure element data so as to restore subordinate figure element data.

* * * * *

UNITED STATES PATENT AND TRADEMARK OFFICE
CERTIFICATE OF CORRECTION

PATENT NO. : 5,075,876
DATED : December 24, 1991
INVENTOR(S) : SEKI et al.

It is certified that error appears in the above-identified patent and that said Letters Patent is hereby corrected as shown below:

TITLE PAGE [57], ABSTRACT:
    Line 2, after "obtains" delete "," (comma).

COL. 1,   line 16, "structure" should be --structure.--;
          line 19, "etc)" should be --etc.)--;
          line 20, "form" should be --form.--.

COL. 4,   line 8, "Of" should be --If--.

\*   COL. 7,   line 41, "displayed" should be --displayed:--.

Signed and Sealed this

Thirteenth Day of April, 1993

*Attest:*

STEPHEN G. KUNIN

*Attesting Officer*     *Acting Commissioner of Patents and Trademarks*